(12) United States Patent
Cummings

(10) Patent No.: US 8,087,674 B2
(45) Date of Patent: Jan. 3, 2012

(54) FIREWALL SEALING ASSEMBLY

(75) Inventor: Mark R. Cummings, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 468 days.

(21) Appl. No.: 11/741,963

(22) Filed: Apr. 30, 2007

(65) Prior Publication Data

US 2008/0265525 A1 Oct. 30, 2008

(51) Int. Cl.
*E04B 1/94* (2006.01)

(52) U.S. Cl. ........ 277/606; 277/616; 277/627; 277/630; 277/650; 277/933; 52/317; 52/232; 52/220.8

(58) Field of Classification Search ................. 277/603, 277/606, 609, 616, 627, 630, 637, 650, 930, 277/654, 931, 933; 52/317, 232, 220.8
See application file for complete search history.

(56) References Cited

U.S. PATENT DOCUMENTS

| | | | | |
|---|---|---|---|---|
| 2,535,288 A * | 12/1950 | Honkanen | ................. | 277/580 |
| 2,719,737 A | 10/1955 | Fletchher | | |
| 3,466,222 A * | 9/1969 | Curtis | ................. | 428/142 |
| 3,655,907 A * | 4/1972 | Philibert et al. | ................. | 174/77 R |
| 3,697,089 A * | 10/1972 | Jacisin et al. | ................. | 277/606 |
| 4,061,344 A * | 12/1977 | Bradley et al. | ................. | 277/606 |
| 4,245,445 A * | 1/1981 | Heinen | ................. | 52/220.8 |
| 4,249,353 A * | 2/1981 | Berry | ................. | 52/232 |
| 4,331,338 A | 5/1982 | Caldwell et al. | | |
| 4,332,393 A * | 6/1982 | Cuschera | ................. | 277/606 |
| 4,758,028 A | 7/1988 | Davies et al. | | |
| 4,770,643 A | 9/1988 | Castellani et al. | | |
| 4,894,966 A * | 1/1990 | Bailey et al. | ................. | 52/317 |
| 4,961,588 A * | 10/1990 | Brienza | ................. | 277/545 |
| 5,129,201 A * | 7/1992 | Robertson et al. | ................. | 52/232 |
| 5,155,957 A * | 10/1992 | Robertson et al. | ................. | 52/232 |
| 5,156,360 A * | 10/1992 | Shine | ................. | 244/129.1 |
| 5,174,077 A * | 12/1992 | Murota | ................. | 52/232 |
| 5,351,448 A * | 10/1994 | Gohlke et al. | ................. | 52/1 |
| 5,452,551 A * | 9/1995 | Charland et al. | ................. | 52/232 |
| 5,458,343 A | 10/1995 | Dornfeld et al. | | |
| 5,548,934 A | 8/1996 | Israelson | | |
| 6,059,323 A * | 5/2000 | Ekholm et al. | ................. | 285/224 |
| 7,278,258 B2 * | 10/2007 | Greco | ................. | 60/226.2 |
| 7,828,298 B2 * | 11/2010 | Cummings | ................. | 277/502 |
| 2003/0011141 A1 * | 1/2003 | Richter | ................. | 277/606 |
| 2005/0035557 A1 * | 2/2005 | Crawford | ................. | 277/609 |
| 2006/0218934 A1 * | 10/2006 | Williams et al. | ................. | 60/785 |

FOREIGN PATENT DOCUMENTS

| | | |
|---|---|---|
| DE | 19719777 | 12/1997 |
| EP | 1482228 A1 | 12/2004 |
| EP | 1764539 A2 * | 3/2007 |
| GB | 2247724 | 3/1992 |

OTHER PUBLICATIONS

European Search Report, EP 08155521 dated Sep. 17, 2008.

* cited by examiner

*Primary Examiner* — Alison Pickard
(74) *Attorney, Agent, or Firm* — Ingrassia Fisher & Lorenz, P.C.

(57) ABSTRACT

A firewall sealing assembly is provided for use between a firewall and a penetrating member. The assembly comprises a primary seal, a secondary seal, and a plurality of retaining rings. The primary seal is configured to provide a primary seal between the firewall and the penetrating member. The secondary seal is configured to provide a secondary seal between the firewall and the penetrating member. The secondary seal is positioned spaced apart from the primary seal to define a seal cavity there between.

16 Claims, 2 Drawing Sheets

FIREWALL SEALING ASSEMBLY

TECHNICAL FIELD

The present invention relates to firewall seals, and more particularly to firewall seals for pass-throughs that substantially seal one side of a firewall from another.

BACKGROUND

Aircraft typically include firewalls that isolate fire zones from non-fire zones, or one fire zone from another fire zone. In one particular implementation, an aircraft engine includes a firewall that divides the engine into a fire zone and an ignition zone. Typically the fire zone is located in a forward section of the engine and is cooler than the ignition zone, which is located downstream of the fire zone. The firewall is generally annular in shape and located proximate the engine combustor. The firewall surrounds various engine lines, such as fuel and oil lines that provide fuel and oil to the combustor. During operation of the engine, the firewall serves to reduce the possibility of any fuel or oil that has leaked into the fire zone from reaching the ignition zone, where it may ignite and damage the engine and its components. The Federal Aviation Agency (FAA) has stated that firewalls of this type must be capable of containing a fire occurring in the fire zone for a predetermined amount of time. The typical fire test requirements as promulgated by the FAA in Circular 20-135 include withstanding fire at 2,000° F. (1093° C.) for fifteen minutes.

Often, a firewall may include openings that allow system connection equipment, such as ducting, piping and/or wires to extend therethrough to connect the systems to each other. In an aircraft engine, a plurality of pass-through members, such as high pressure (HP) bleed lines, thermal anti-ice (TAI) lines, and electrical wires pass through the firewall and are sealed to prevent or minimize communication of any fuel or oil leakage between the fire zone and the ignition zone. In other cases, sealing (or flow restriction) is needed to minimize leakage across a firewall that separates zones of differential pressure. In some cases, gaps may be present between the pass-through members and the firewall, which, in the unlikely event of a fire, may provide a space through which flames may travel. As a result, specialized firewall seals may need to be included between the equipment and the firewall to prevent the flames from traveling from one side of the firewall to the other.

Attempts have been made to meet the FAA requirement for engine firewalls by sealing the firewall pass-throughs in various ways. Many types of firewall seals have been devised that require the positioning of a portion of a sealing structure through an aperture formed in the firewall. The pass-through line extends through an opening formed in the sealing structure. However, due to typical manufacturing tolerances, these types of structures may be seated in a laterally offset manner from the centerline of the firewall aperture, or may be misaligned, which decreases the sealing effect. In addition, over time damage may occur to the portion of the sealing structure that is in contact with the ignition zone.

Additional attempts at sealing firewall pass-throughs include the use of a fireproof, reinforced silicone primary seal or boot that provides a barrier between the fire zone and the ignition zone by surrounding structural tubing that extends through the firewall. Testing for fireproofness of this type of single component structure often results in failure with ignition on the backside of the primary seal. Still other types of fittings include the use of bulkhead connectors, close tolerance fittings, single purpose penetration ducting or flanged connections at the firewall.

Although the above-mentioned firewall seals are in many instances adequate for preventing flames from traveling through the firewall, they suffer from certain drawbacks. In particular, many of the fittings do not provide adequate means to eliminate backside ignition, may include a number of components that together are relatively heavy and may undesirable increase aircraft weight, and/or may be relatively costly to implement. In addition, many of the fittings rigidly attach the system connection equipment to the firewall, which may unnecessarily increase the load on the fitting and/or the firewall.

It should thus be appreciated from the above that it would be desirable to provide a firewall pass-through seal assembly that complies with the FAA fireproof standard and eliminates damage to engine components due to seal failure. Furthermore, there is a need for a seal assembly that is relatively lightweight and inexpensive to implement. Other desirable features and characteristics of the present invention will become apparent from the subsequent detailed description of the invention and the appended claims, taken in conjunction with the accompanying drawings and this background of the invention.

BRIEF SUMMARY

There has now been developed a firewall sealing assembly for sealing between a firewall and a penetrating member, the assembly comprising a firewall sealing assembly for sealing between a firewall and a penetrating member comprising: a plurality of retaining rings; a primary seal disposed between two of the retaining rings and configured to provide a primary seal between the firewall and the penetrating member; and a secondary seal disposed between two of the retaining rings and configured to provide a secondary seal between the firewall and the penetrating member. The plurality of retaining rings, the primary seal and the secondary seal are each dimensioned to define a seal cavity between the primary seal and the secondary seal.

In yet another embodiment there is provided a firewall sealing assembly for sealing between a firewall and a penetrating member, the assembly comprising a firewall sealing assembly for sealing between a firewall and a penetrating member comprising: a plurality of retaining rings; a primary seal disposed between two of the retaining rings and having an outer and an inner radial wall and an axial wall coupled there between, the axial wall extending axially between the outer radial wall and the inner radial wall, the inner radial wall having an inner peripheral edge defining an opening through which the penetrating member may extend; and a secondary seal disposed between two of the retaining rings and having an outer and an inner radial wall and an axial wall coupled there between, the axial wall extending axially between the outer radial wall and the inner radial wall, the inner radial wall having an inner peripheral edge defining an opening through which the penetrating member may extend, the secondary seal positioned spaced apart from the primary seal. The plurality of retaining rings, the primary seal, and the secondary seal are each dimensioned to define a seal cavity between the primary seal and the secondary seal.

In a further embodiment, still by way of example only, there is provided a firewall sealing assembly for sealing between a firewall and a penetrating member, the assembly comprising a firewall sealing assembly for sealing between a firewall and a penetrating member comprising: a primary seal configured to provide a primary seal between the firewall and the penetrating member, the primary seal having an outer and an inner radial wall and an axial wall, the axial wall extending axially between the outer radial wall and the inner radial wall, the inner radial wall having an inner peripheral edge defining an opening through which the penetrating member may extend; a secondary seal configured to provide a redundant seal between the firewall and the penetrating member, the secondary seal having an outer and an inner radial wall and an axial wall, the axial wall extending axially between the outer radial wall and the inner radial wall, the inner radial wall having an inner peripheral edge defining an opening through which the penetrating member may extend; a plurality of retaining rings coupled to the primary seal and the secondary seal in alternating configuration and coupling the primary seal and the secondary seal to the firewall; and a seal cavity defined between the primary seal and the secondary seal.

Other independent features and advantages of the improved firewall sealing assembly will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figure, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, before proceeding with the detailed description, it is to be appreciated that the described embodiment is not limited to use in conjunction with a specific type of vehicle or engine system. Thus, although the description is explicitly directed toward an embodiment that is implemented in an aircraft engine, it should be appreciated that it can be implemented in many types of vehicles and other system designs, including those known now or hereafter in the art.

Figure 1:
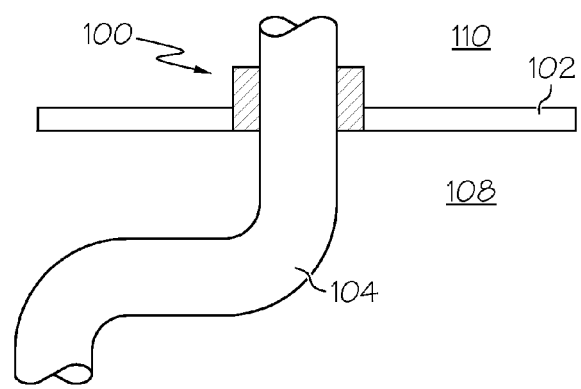
FIG. 1 is a cross section view of an exemplary firewall sealing assembly including a primary seal and a secondary seal installed between a firewall and a duct.

Turning now to FIG. 1, an exemplary firewall sealing assembly 100 is shown mounted between a firewall 102 and a duct 104. The firewall sealing assembly 100 allows the duct 104 to extend through an opening 106 in the firewall 102 while minimizing fluid flow communication between a first section 108 on one side of the firewall 102 and a second section 110 on another side of the firewall 102. It will be appreciated that the duct 104 may alternatively be any one of numerous other components that may need to extend through the firewall opening 106, such as, for example, piping, wires, structural tubing, and any other penetrating member.

Figure 2:
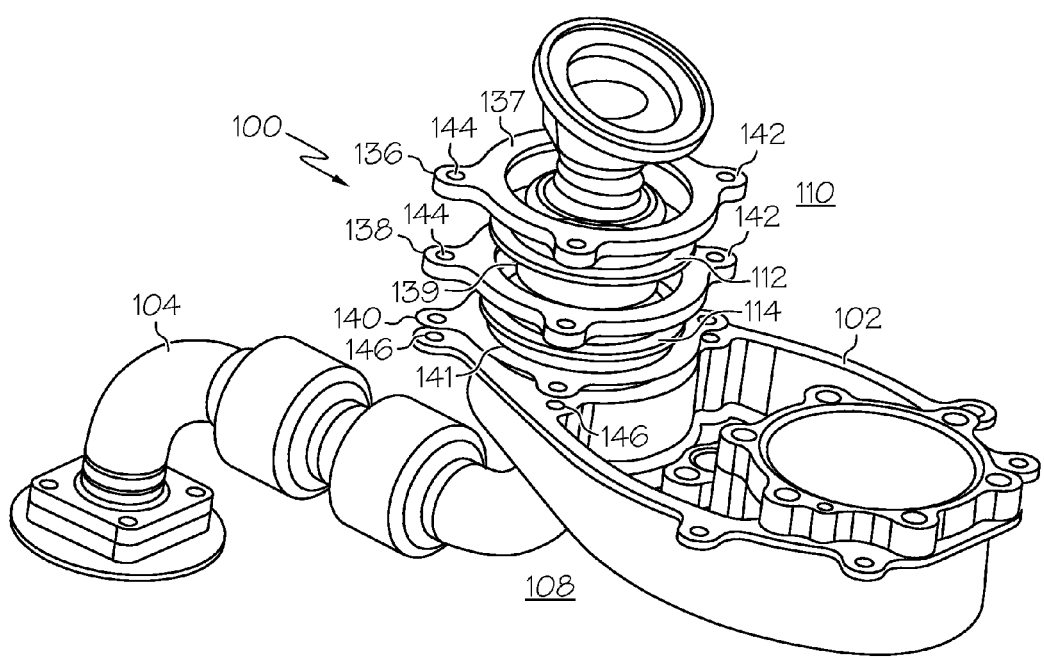
FIG. 2 is an exploded view of a specific implementation of a firewall sealing assembly illustrating the primary seal and the secondary seal.
Figure 3:
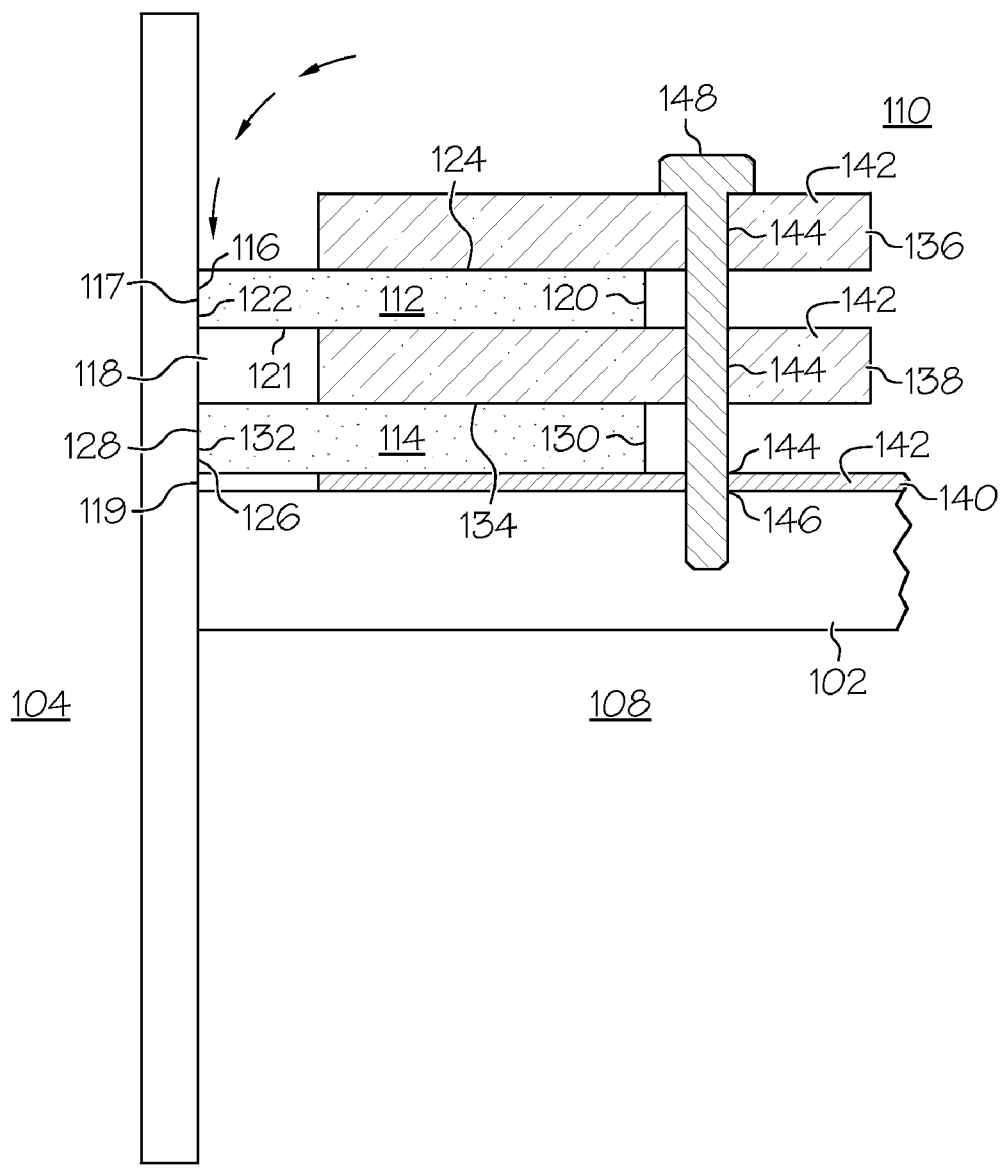
FIG. 3 is a close up view of a section of the primary seal and the secondary seal depicted in FIG. 2.

FIGS. 2 and 3 are close up views of the firewall sealing assembly 100 depicted in FIG. 1. The firewall sealing assembly 100 includes redundant fire barriers comprised of a primary seal 112 and a secondary seal 114. The primary seal 112 is generally annular in shape and includes an inner peripheral edge 116 that defines a duct opening 117. More specifically, the primary seal 112 includes an outer radial wall 120 and an inner radial wall 122 and an axial wall 124. The axial wall 124 extends axially between the outer radial wall 120 and the inner radial wall 122. The inner radial wall 122 defines the inner peripheral edge 116 and the duct opening 117 through which the duct 104 extends.

In a preferred embodiment the primary seal 112 is formed of a flexible fireproof material, such as fiberglass reinforced silicone or plastic composite, such as graphite-bismaleimide, that is conformable under pressure to the duct opening 117 and the duct 104. The duct opening 117 is sufficiently sized to allow the duct 104 to extend therethrough.

As best seen in FIG. 2, the secondary seal 114 is also generally annular in shape and includes an inner peripheral edge 126 that defines a duct opening 128. More specifically, the secondary seal 114 includes an outer radial wall 130 and an inner radial wall 132 and an axial wall 134. The axial wall 134 extends axially between the outer radial wall 130 and the inner radial wall 132. The inner radial wall 132 defines the inner peripheral edge 126 and the duct opening 128 through which the duct 104 extends. In one particular instance, the secondary seal 114 is a silicone washer that is conformable under pressure to the duct opening 128 and the duct 104. The duct opening 128 is sufficiently sized to allow the duct 104 to extend therethrough.

A plurality of retaining rings 136 and 138 provide securement of the primary seal 112 and the secondary seal 114 to the firewall 102. Each of the plurality of retaining rings 136 and 138 are preferably configured as annular shaped components positioned in alternating pattern with the primary seal 112 and the secondary seal 114 to retain the firewall sealing assembly 100, and more particularly the primary seal 112 and the secondary seal 114, to the firewall 102. Each of the plurality of retaining rings 136 and 138 includes a plurality of tabs 142 extending from a periphery thereof. Each of the plurality of tabs 142 includes a fastener opening 144 disposed in a pattern such that at least selected ones correspond to one or more spaced apart firewall fastener openings 146. Each of the fastener openings 144 is configured to receive fasteners 148 for mounting the primary seal 112 and the secondary seal 114 to the firewall 102.

An anti-friction plate 140 is provided between the secondary seal 114 and the firewall 102. The anti-friction plate 140 provides for the reduction of friction between the secondary seal 114 and the firewall 102 during movement of the duct 104 relative to the firewall 102. Furthermore, the flexibility of the primary seal 102 and the secondary seal 114 along with the radial clearance between the seals and the retaining rings 136 and 138 allows for relative movement of the duct 104 to the firewall 102.

The primary seal 112, the secondary seal 114, and the retaining ring 138 define a seal cavity 118 proximate the duct 104. More specifically, each of the plurality of retaining rings 136 and 138, and the anti-friction plate 140 includes a duct opening 137, 139 and 141, respectively, of a dimension greater than the dimension of the duct opening 117 of the primary seal 112 and duct opening 128 of the secondary seal 114. This difference in the dimension of the duct openings 117 and 128 defines the seal cavity 118 and the optional seal cavity 119.

During operation, backside flames may be generated on a backside 121 of the primary seal 112. The backside flames are the result of combustible materials reaching high enough temperatures to ignite, but remain of low intensity. The backside flames burn within the seal cavity 118, being limited therein by the secondary seal 114. The secondary seal 114 thus is exposed to limited flame exposure in intensity and duration. The flame side seal, and more particularly the primary seal 112, is sacrificial, in that the secondary seal 114 prevents the flame from continuing. In this regard, the secondary seal 114 is constructed of a flexible fireproof material, such as, fiber reinforced silicone or plastic composite, for example graphite-bismaleimide. Other suitable flexible fireproof materials may alternatively be used for the primary seal 112 and the secondary seal 114.

To further minimize the travel of fire through the firewall 102, gaskets (not shown) may be included between the secondary seal 114 and the firewall 102. Flow through the firewall sealing assembly 100 is indicated by the directional arrows in FIG. 3. In the instance where the primary seal 112 fails, or is subject to backside ignition and burn within the seal cavity 118, the secondary seal 114 provides additional protection to the second section 110.

A firewall sealing assembly 100 has now been provided that is fireproof and relatively lightweight. Additionally, the assembly includes few parts and is relatively simple to implement. The use of the primary seal 112, the secondary seal 114, provision of the seal cavity 118, the plurality of retaining rings 136 and 138, the anti-friction plate 140, and sizing of the duct openings 117 and 128 relative to the duct 104, provide a redundant sealing interface between the firewall 102 and the duct 104.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A firewall sealing assembly configured to be mounted to a firewall and around a penetrating member, the firewall sealing assembly comprising:
    first and second retaining rings each having an opening formed therein through which the penetrating member is received when the firewall sealing assembly is mounted to the firewall;
    a primary seal retained between the first and second retaining rings and configured to sealingly engage an outer surface of the penetrating member when the firewall sealing assembly is mounted to the firewall;
    a secondary seal disposed adjacent the second retaining ring substantially opposite the primary seal and configured to sealingly engage an outer surface of the penetrating member when the firewall sealing assembly is mounted to the firewall; and
    an anti-friction plate disposed adjacent the secondary seal substantially opposite the second retaining ring;
    wherein the first and second retaining rings, the primary seal, and the anti-friction plate cooperate with the penetrating member and the firewall to define first and second seal cavities when the firewall assembly is mounted to the firewall, the first seal cavity axially bounded by the primary seal and the secondary seal and radially bounded by an inner peripheral edge of the second retaining ring and an outer surface of the penetrating member, and the second seal cavity axially bounded by the secondary seal and the firewall and radially bounded by an inner peripheral edge of the anti-friction plate and an outer surface of the penetrating member.

2. A firewall sealing assembly as claimed in claim 1, wherein the primary seal is configured to backside burn upon exposure to a predetermined temperature.

3. A firewall sealing assembly as claimed in claim 1, wherein the primary seal includes an outer radial wall, an inner radial wall, and an axial wall, the axial wall extending axially between the outer radial wall and the inner radial, the inner radial wall having an inner peripheral edge defining an opening through which the penetrating member may extend.

4. A firewall sealing assembly as claimed in claim 3, wherein the primary seal and the secondary seal are conformable fire resistant washers.

5. A firewall sealing assembly as claimed in claim 3, wherein the primary seal and the secondary seal are formed of a flexible fire resistant material.

6. A firewall sealing assembly as claimed in claim 5, wherein the fire resistant material comprises one of a fiberglass reinforced silicone or a fiber reinforced plastic composite.

7. A firewall sealing assembly as claimed in claim 6, wherein the fire resistant material comprises graphite-bismaleimide.

8. A firewall sealing assembly as claimed in claim 1, wherein the secondary seal includes an outer radial wall, an inner radial wall, and an axial wall, the axial wall extending axially between the outer radial wall and the inner radial, the inner radial wall having an inner peripheral edge defining an opening through which the penetrating member may extend.

9. A firewall sealing assembly configured to be mounted to a firewall and around a penetrating member, the firewall sealing assembly comprising:
    a plurality of substantially annular seals; and
    a plurality of retaining rings positioned in an alternating pattern with the plurality of substantially annular seals and configured to retain the plurality of substantially annular seals against the penetrating member when the firewall sealing assembly is mounted to the firewall, at least one of the plurality of retaining rings radially spaced from an outer surface of the penetrating member when the firewall sealing assembly is mounted to the firewall to form an annular seal cavity proximate the penetrating member configured to contain backside flames that burn through the primary seal;
    wherein the plurality of annular seals is axially spaced apart by and captured against the penetrating member by the plurality of retaining rings.

10. A firewall sealing assembly according to claim 9 wherein the plurality of retaining rings comprises a first retaining ring and a second retaining ring, and wherein the plurality of substantially annular seals comprises:
    a primary seal disposed between and in contact with the first retaining ring and the second retaining ring; and
    a secondary seal contacting the second retaining ring substantially opposite the primary seal.

11. A firewall sealing assembly according to claim 10 further comprising an anti-friction plate contacting the secondary seal substantially opposite the second retaining ring.

12. A firewall sealing assembly according to claim 10 wherein the inner diameters of the primary seal and the secondary seal are substantially equivalent to the outer diameter of the penetrating member, and wherein the inner diameters of the first retaining ring and the second retaining ring are greater than the outer diameter of the penetrating member such that a plurality of annular seal cavities is formed between the firewall sealing assembly and the penetrating member when the firewall sealing assembly is mounted to the firewall and around the penetrating member.

13. A firewall sealing assembly configured to be mounted to a firewall and around a penetrating member, the firewall sealing assembly comprising:
first and second retaining rings;
a primary seal disposed between the first and second retaining rings;
a secondary seal disposed adjacent the second retaining ring substantially opposite the primary seal; and
an anti-friction plate disposed adjacent the secondary seal substantially opposite the second retaining ring, the anti-friction plate cooperating with the second retaining ring, the firewall, and the penetrating member to define a seal cavity between the anti-friction plate and the penetrating member when the firewall sealing assembly is mounted to the firewall.

14. A firewall sealing assembly according to claim 13 wherein the firewall sealing assembly is configured to be mounted to the firewall utilizing a plurality of fasteners, and wherein the first and second retaining rings each include a plurality of tabs extending from a periphery thereof each having a fastener opening through which one the plurality of fasteners extends when the firewall sealing assembly is mounted to the firewall.

15. A firewall sealing assembly according to claim 14 wherein the anti-friction plate includes a plurality of tab through which the plurality of fasteners extends when the firewall sealing assembly is mounted to the firewall.

16. A firewall sealing assembly according to claim 14 wherein the plurality of fasteners does not extend through the primary seal when the firewall sealing assembly is mounted to the firewall.

* * * * *